United States Patent [19]

Handorf

[11] Patent Number: 5,313,578
[45] Date of Patent: May 17, 1994

[54] PORTABLE INTERPROCESS COMMUNICATION FACILITY

[75] Inventor: J. Christopher Handorf, Mesa, Ariz.

[73] Assignee: Motorola, Inc., Schaumburg, Ill.

[21] Appl. No.: 644,820

[22] Filed: Dec. 23, 1990

[51] Int. Cl.$^5$ ............................................. G06F 13/00
[52] U.S. Cl. ................................................... 395/200
[58] Field of Search ................. 364/DIG. 1, DIG. 2; 395/200, 725, 275; 370/58.2, 60

[56] References Cited

U.S. PATENT DOCUMENTS 4,447,874  5/1984  Bradley et al. ..................... 364/200

OTHER PUBLICATIONS

G. J. Nutt, "Open Systems", Prentice Hall, 1992, pp. 1-35.
"Getting Started with cX", Computer X, Inc., 1982, pp. 4 and 6.

Primary Examiner—Robert L. Richardson
Attorney, Agent, or Firm—Michael A. Waters; Joe E. Barbee

[57] ABSTRACT

A portable interprocess communication facility by which different processes running simultaneously on a network of computer systems can efficiently communicate variable sized data blocks between each other. This involves the elements and techniques necessary to achieve high speed communication, without requiring the processes to be located on the same physical system or to be completely dependant upon the particular design or revision of the operating system in which they run. In addition, the invention simplifies the task of porting a modular software system between different hardware devices and operating systems by allowing communicating processes to be only loosely connected to the operating system.

9 Claims, 2 Drawing Sheets

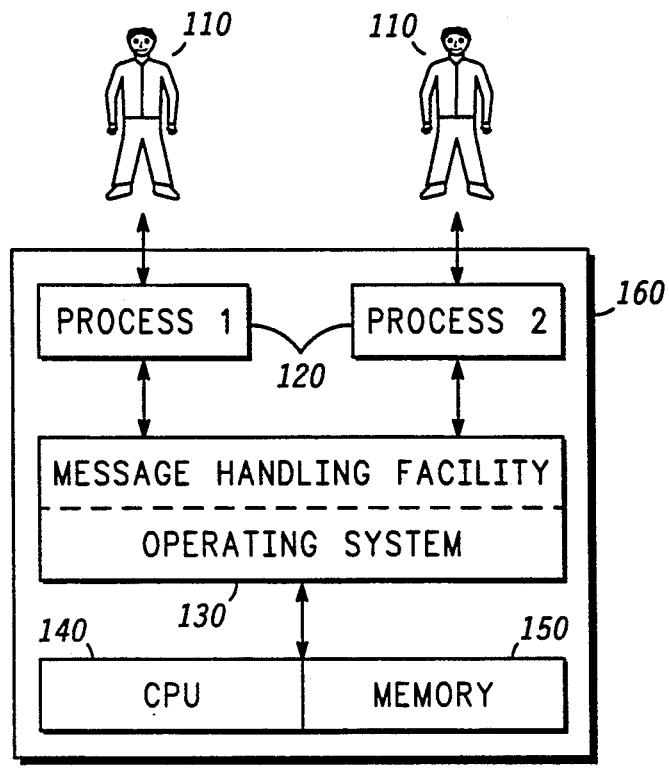
FIG. 1
-PRIOR ART-
FIG. 2
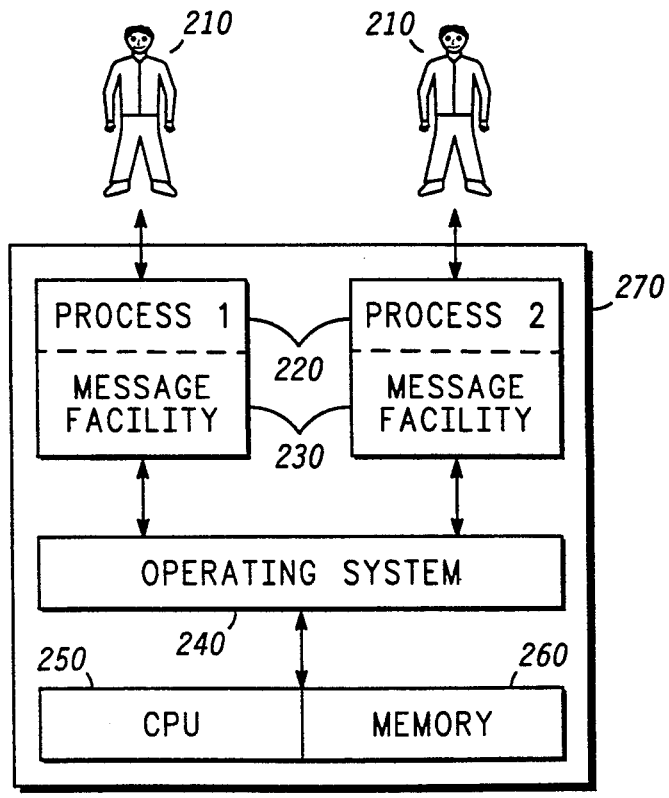

5,313,578

PORTABLE INTERPROCESS COMMUNICATION FACILITY

BACKGROUND OF THE INVENTION

The present invention relates, in general, to communication of information between software processes, and more particularly to efficient interprocess communication which is largely independent of the operating system used.

The prior art includes a variety of interprocess communication methods. The most common method is to allow two or more processes to utilize the same physical area of a magnetic surface to store and retrieve information. Another common method requires communicating processes to send information grouped a few bytes at a time to an operating system controlled area of random access memory, typically called a pipe or stream. The receiving process then reads data from this area in the same groups of a few bytes of information at a time.

A method typical of the prior art is the "Method of Interprocess Communication in a Distributed Data Processing System" (U.S. Pat. No. 4,694,396 which issued to B. Weisshaar et al on Sep. 15, 1987). This method defines a proprietary operating system which allows processes running on a computer to efficiently pass variable sized messages between each other. Moreover, processes running on other computers using this same operating system may communicate messages, so long as the two computers are connected by some type of network. This method of achieving interprocess communication is designed to be part of an operating system which controls and allocates all system resources. As a result, this method relies heavily on a close interaction with the operating system for its basic functions such as queue management and hence is only useable in conjunction with that operating system. This greatly restricts the capability to integrate process communication between computers using different operating systems or to move an application program which uses communicating processes onto a different system. In applications such as electronic mail this restriction can be a major limitation to the usefulness of the application.

There is a considerable need to provide an efficient interprocess communication method for processes on a distributed computer system. The computer system may be a single piece of hardware with appropriate operating system software or may be made up from several different pieces of hardware using the same or different operating systems connected together by a network. The method must allow processes to quickly communicate variable sized messages between themselves and allow software systems using this method to be ported to other hardware devices and operating systems.

SUMMARY OF THE INVENTION

Briefly stated, the present invention involves a facility by which different processes running simultaneously on a computer system can efficiently communicate variable sized data blocks between each other. The invention concerns the techniques necessary to achieve high speed communication between two or more processes, without requiring the processes to be located on the same physical system or to be completely dependant upon the particular design or revision of the operating system in which they run. In addition, the invention simplifies the task of porting a modular software system between different hardware devices and operating systems by allowing communicating processes to be only loosely connected to the operating system.

BRIEF DESCRIPTION OF THE DRAWINGS

FIG. 1 illustrates a hierarchy of interfacing on a computer system according to the prior art method of interprocess communication;

FIG. 2 illustrates a hierarchy of interfacing on a computer system according to the present invention's method of interprocess communication.

DETAILED DESCRIPTION OF THE DRAWINGS

Figure 3:
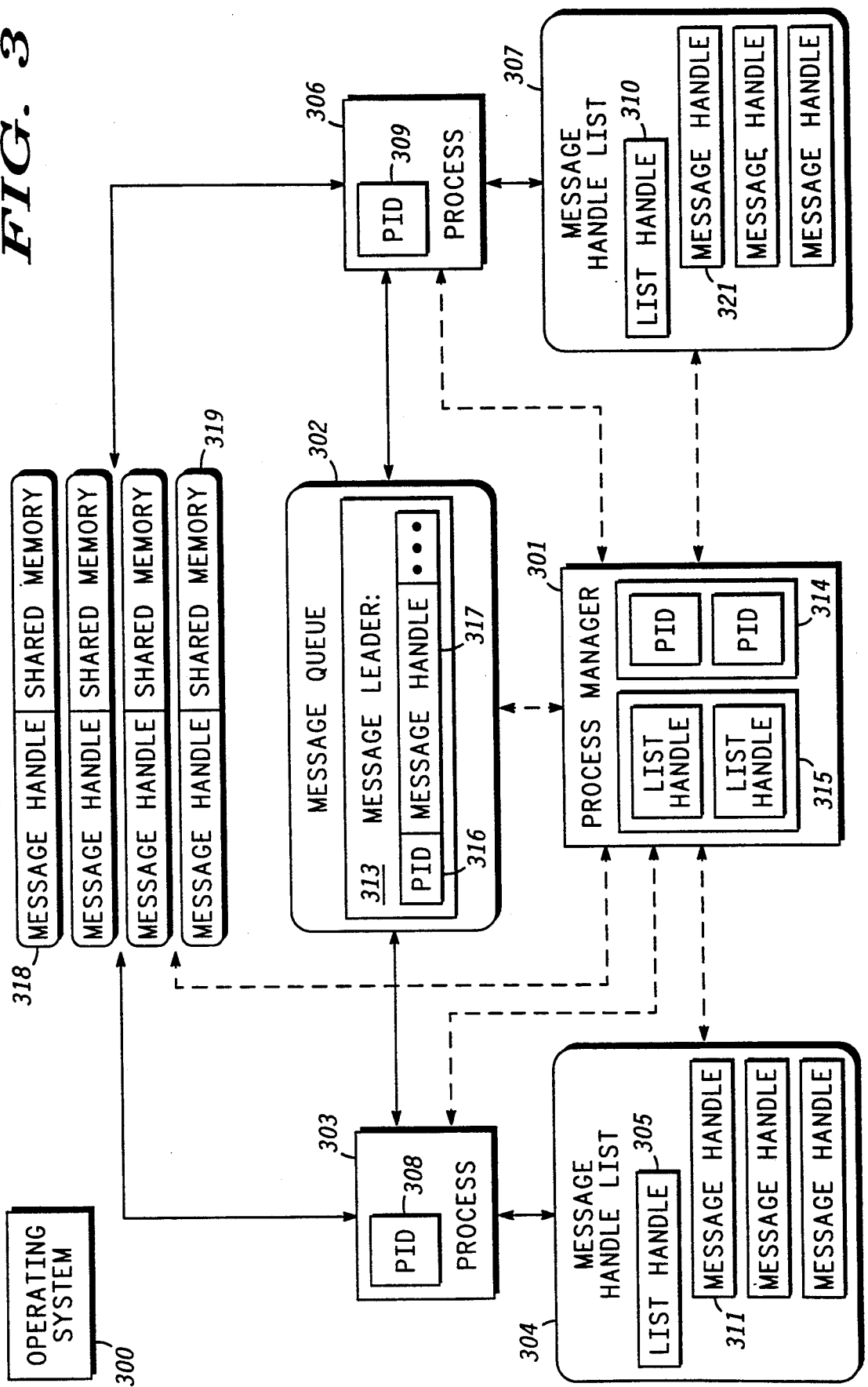
FIG. 3 illustrates an interprocess communication method according to the present invention on a single computer system.

FIG. 1 illustrates a hierarchy of interfacing that occurs when a plurality of users 110 operate a plurality of active processes 120 running on a computer system 160 that supports a method of interprocess communication according to the prior art. Users 110 interface with processes 120 running on system 160 through remote terminals. Processes 120, in turn, must interface with a message facilitating operating system 130 which controls their allocation to limited resources of system 160 such as a central processing unit (CPU) 140 and a block of memory 150. Essentially all of the interprocess communication takes place within the operating system so a process must be designed and implemented to suit the particular implementation of interprocess communication within that operating system.

FIG. 2 illustrates a hierarchy of interfacing that occurs when a plurality of users 210 communicate via a plurality of active processes 220 on a computer system 270 that supports a method of interprocess communication according to the present invention. Users 210 interface with active processes 220 that are a composite of logic which performs the primary function and a message facility 230. The interfacing continues to an operating system 240, a CPU 250 and a block of memory 260. The interprocess communication takes place under the control of each user's process and so is independent of the particular operating system being used. If a process is run using different hardware or a different operating system then the interprocess communication can also be run on the new system. Furthermore, the processes can be run using a distributed network of computers with the low level functions required for communication being handled by the network software.

FIG. 3 shows a portable interprocess communication facility on a single computer system as a preferred embodiment of this invention. An operating system 300 serves to control the running of each process, allocates memory either to a specific process or to be shared between several processes, and will uniquely identify each active process on demand. A process identifier code or PID is assigned to each process by the operating system and uniquely identifies each process. In a networked system the PID must also contain a means to identify which system of the network is being used to run the process. Before any message may be transmitted, a process manager 301 must be made active. Process manager 301 keeps track of the PID which is assigned to each process, creates and manages a message queue 302, and performs various administrative services such as removing extraneous messages from message queue 302 and the memory occupied by those messages. Message queue 302 is an area of memory which can dynamically accept and surrender a plurality of message leaders 313, each comprising at least a PID 316 and a unique message handle 317.

When a process 303 is started it creates a message handle list 304 to contain a plurality of message handles 311 and passes a list handle 305 to process manager 301. List handle 305 is the information required for process manager 301 to find message handle list 304, likewise each message handle 311 allows a process to find and to access the associated message. List handle 305 is itself kept in a handle list 315 by process manager 301. PID 308 is kept on a PID list 314 by process manager 301 until process 303 terminates. Message handle list 304 is updated whenever process 303 creates, attaches, detaches, or destroys a message and will always contain a list of every message handle owned by process 303. Likewise, when a process 306 starts, it is also assigned a unique PID 309 which is added to PID list 314, it creates a message handle list 307 to contain a plurality of message handles 321, and list handle 310 is added to handle list 315. Once the two processes 303 and 306 are active the interprocess communication may begin.

For process 303 to send a message to process 306, a region of shared memory 319 is established by operating system 300 with a unique message handle 318. Process 303 places a copy of message handle 318 into its message handle list 304 indicating that this message belongs to process 303. The information to be transmitted is then placed into shared memory 319. Process 303 then releases shared memory 319 by removing message handle 318 from its message handle list 304, ensuring that shared memory 319 is attached to only one process at a time. Process 303 now sends message leader 313 into message queue 302. Within message leader 313 are PID 316 and message handle 317. PID 316 contains a copy of PID 309 identifying process 306 as the destination process for this message. Message handle 317 contains a copy of message handle 318 identifying the memory location of the message itself.

To receive the message transmitted by process 303, process 306 must examine message queue 302 for any message leader 313 which contains a PID 316 matching its own PID 309. When a matching PID 316 is identified process 306 must first place message handle 317 into message handle area 307. Next process 306 will use message handle 317 to locate and read the message from shared memory 319. When process 306 has finished with shared memory 319, it removes message handle 318 from message handle area 307 and allows operating system 300 to release shared memory 319 for reuse.

Error conditions make it possible for process 306 to send a message to a destination process that never existed, or for process 303 to terminate before releasing the messages it owns. Shared memory 319 remains in memory and continues to use system resources. To remove these extraneous messages, process manager 301 performs a clean up operation periodically. Process manager 301 first determines if any processes have terminated since the last clean up. If no process has terminated then process manager 301 cleans up only message queue 302. However assuming that process 303 has terminated, process manager 301 reads the message handle list 304 and examines the contents. Process manager 301 allows operating system 300 to release the shared memory 319 identified by each message handle 311 found in the list. After examining message handle list 304, process manager 301 allows operating system 300 to release it also. Process manager 301 then starts to clean up message queue 302 by sending a lock instruction to disable access by any other process. Every message leader 313 in message queue 302 is read by process manager 301 and its PID 316 is examined. If any PID 316 is not found in PID list 314, the list of active processes, process manager 301 destroys the message. Each remaining message leader 313 is replaced in message queue 302 and message queue 302 is unlocked by process manager 301 allowing interprocess message handling to proceed.

An alternative embodiment of this invention has process 306 running on a second computer system which is connected to the first system by a network. In this embodiment process 306 must use the processes which service the network to retrieve data from shared memory 319 and from message queue 302. In addition process manager 301 must use the network processes to receive PID 309 from the remote computer system as well as to access message handle list 307. In a typical implementation, these low level network read and write functions are handled as special server processes within the network software. It should be apparent that operation of the interprocess communication facility using a network is essentially unchanged from a single CPU operation. This allows great flexibility in the application of this capability.

As can be seen from the descriptions and illustrations above, the invention provides a method which allows separate processes on a distributed computer system with different operating systems to efficiently communicate variable sized messages. This invention allows the same message handling software to be used with either a single computer or a network of heterogeneous computers. In addition, the invention simplifies the task of porting large communications oriented software systems to other operating systems.

I claim:

1. A portable interprocess communication facility comprising:
    running a plurality of user programs as independent processes;
    identifying a process so a first process may uniquely identify a desired second process;
    allocating a region of memory to be shared by a plurality of processes;
    uniquely identifying a predetermined portion of the region of memory so that the identified predetermined portion of memory may be used to store and to retrieve a message;
    queuing messages which contain at least the process identifier of the desired second process and the message handle of the identified predetermined portion of memory; and
    retrieving the message from the identified predetermined portion of memory using the message handle.

2. The portable interprocess communication facility of claim 1 further comprising:
    cleaning up at predetermined intervals by inspecting a list of processes to determine the set processes known to be running, deleting any messages destined for a process which is not known to be running, and releasing the memory associated with the messages which have been deleted.

3. The portable interprocess communication facility of claim 1 further comprising:

allocating the region of memory entirely from high speed random access memory.

4. The portable interprocess communication facility of claim 1 further comprising:

allocating the region of memory entirely from one or more mass storage devices.

5. The portable interprocess communication facility of claim 1 further comprising:

running one or more of the user programs as processes on separate computer systems which are linked together by a data communication means.

6. A method for portable interprocess communication, comprising:

identifying a target process;

allocating a shared memory block;

writing information to the shared memory block;

passing a message to the target process which contains an identifier for the shared memory block; and reading the information from the shared memory block by the target process.

7. The method of claim 6, further comprising:

providing a signal at predetermined intervals causing a cleanup process to begin work;

identifying any processes which has stopped running;

freeing shared memory related to any message for any process which has stopped running;

removing all messages from the message queue destined for any process which has stopped running; and removing all messages from the message queue destined for a process which does not exist.

8. A method for portable interprocess communication, comprising:

identifying each process;

allocating a shared memory block for each message;

obtaining a handle by which the memory block may be accessed by any process;

copying information to the shared memory block;

managing a queue of messages which pass messages one at a time from an originating process to a destination process;

passing a message to the destination process which contains a handle for the shared memory block; and reading the information from the shared memory block by the destination process.

9. The method of claim 8, further comprising:

starting a cleanup process at predetermined intervals;

identifying any processes which has terminated;

freeing shared memory related to any message for any process which has terminated;

removing all messages from the message queue destined for any process which has terminated; and removing all messages from the message queue destined for a process which does not exist.

* * * * *